3,418,274
LIQUID COATING COMPOSITION COMPRISING A VINYL CHLORIDE DISPERSION RESIN, A VINYL CHLORIDE COPOLYMER SOLUTION RESIN AND ACRYLIC RESIN IN AN ORGANIC VEHICLE AND METAL COATED THEREWITH
Richard E. Caplan, Waukegan, Robert H. Rosenthal, Highland Park, and Richard W. Clope, Zion, Ill., assignors, by mesne assignments, to The Dexter Corporation, a corporation of Connecticut
No Drawing. Continuation-in-part of application Ser. No. 368,321, May 18, 1964. This application Dec. 15, 1965, Ser. No. 514,108
13 Claims. (Cl. 260—41)

ABSTRACT OF THE DISCLOSURE

Disclosed is a liquid coating composition, suitable for use as a baked-on metal coating, which comprises 20–70% by weight of non-volatiles containing 10–34 parts percent vinyl chloride dispersion resin, 9–34 parts of vinyl chloride copolymer solution resin, and about 2–40 parts of acrylic resin in an organic liquid vehicle.

---

The present application is a continuation-in-part of our copending application Ser. No. 368,321, filed May 18, 1964 now abandoned, which is a continuation of our copending application Ser. No. 120,154 filed June 28, 1961, now abandoned, which was a division of our copending application Ser. No. 70,909, filed Nov. 22, 1960 now abandoned.

This invention relates to coating compositions and metal surfaces coated therewith.

These coating compositions may be easily applied as a liquid and baked on the surfaces of a wide variety of metals without requiring the prior application of a primer coating composition. The resulting baked-on coating adheres tenaciously to the underlying surface and has good toughness properties.

Further, by controlling the preparation of and constituents in the coating composition (substantially homogeneous), one may prepare a composition that produces a coating with (a) either a high gloss finish or low gloss finish with low or high angular sheen, (b) good color retention, (c) good weatherability, (d) good chemical resistance, and (e) good flexibility. The outstanding flexible and adhesive qualities of the coating permit the coated metal to be fabricated (for example, bent in a brake or by roll-formers) or further treated or shaped for its end use without chipping, peeling or fracturing from the metal surface to expose said surface.

Still further, the liquid coating composition may be stored, prior to its application to metal surfaces, for periods of about six months without any material change in its viscosity, although some increase gradually occurs during this period. However, if the composition is to be stored for longer periods of time, the viscosity may be adjusted by adding solvents and diluents.

Our coating compositions are particularly well-suited for coating aluminum (includes aluminum alloys), as well as copper, ferrous metals such as steel, and zinc die castings. The coating (e.g., strip coating) of aluminum is of particular importance because this metal is particularly well suited for post-forming operations. The metal need not be first coated with an organic primer, however, the metal should be first treated in the customary manner with a conversion coating such as "Alodine 1200 S" or "Bonderite 721." Both "Alodine 1200 S" and "Bonderite 721" are used to form amorphous chromate coating. Their formulations are composed of hexavalent chromium ions, fluoride ions and ferricyanide ions similar to those described in U.S. Patent 2,796,370.

The liquid coating compositions embraced by our invention may be applied to metal surfaces by the usual roll-coating machines, or they may be applied by brushing, spraying or dipping operations. After the liquid coating composition is applied to the metal surfaces, the coated metal should be baked for approximately 1–4 minutes at about 350–450° F. We have found that excellent results are obtained when the coated metal is baked for 1½ minutes at 400° F.

It is indeed remarkable that a substantially homogeneous liquid coating could be prepared having a combination of such outstanding characteristics.

The liquid coating compositions (as applied to the surfaces to be coated) embraced by this invention may contain the following components:

(a) An organosal dispersion resin component;
(b) A solvent and/or diluent (includes combinations thereof);
(c) A plasticizer (includes combinations thereof);
(d) A stabilizer (includes combinations thereof);
(e) A vinyl chloride copolymer solution resin component;
(f) A vinyl chloride-vinylidene chloride solution resin component;
(g) An acrylic resin component comprising a non-air-drying acrylic casting type resin syrup and/or an air-dry or bake (thermoplastic or thermosetting) solution type acrylic resin; and
(h) A pigment (includes a combination thereof).

In some instances, an ingredient or component may provide multiple functions. An ingredient, for example, may serve as both a plasticizer as well as stabilizer.

If desired, the pigment may be omitted. The plasticizer and/or vinyl chloride-vinylidene chloride components, for example, may likewise be omitted; however, superior results may be obtained when they are present in the coating composition.

Components (e)–(g), above, are considered as being organosol resin modifiers.

The term "organosol" herein refers to compositions that contain vinyl chloride polymer and volatile dispersing liquid and/or diluent.

The plasticizer, modifying resins, diluent and solvent may be separately incorporated into the liquid coating composition or added thereto as part of the organosol component.

The organosol dispersion component is a dispersion of a vinyl chloride resin, such as polyvinyl chloride and/or polyvinyl chloride-diethyl maleate copolymer resin. It contains, in addition to the resin, a diluent and/or dispersant. The vinyl resin should contain at least about 90% by weight of polymerized vinyl chloride, preferably more. Particularly good results are obtained with a vinyl chloride resin having an average molecular weight of at least about 20,000.

A stabilizing agent that inhibits thermal and ultra-violet decomposition is used in conjunction with the vinyl chloride resin. In addition, if desired, a suitable plasticizer may be present in or added to the organosol resin component.

Commercially available vinyl chloride dispersion grade resins such as the following may be used in the organosol component: "Bakelite OYNV" is a white powdered solid containing about 98–99% by weight polyvinyl chloride, and has a specific gravity of about 1.40 and a specific viscosity from about 0.240 to 0.32 as measured by 0.2 gm. resin per 100 ml. of nitrobenzene at 20° C.; "Opalon 410" is a dispersion grade polyvinyl chloride of a stir-in type having the following properties: consistency—powder, color—white, specific gravity—about 1.40, specific viscosity (solution of 0.40 gm. of polymer in 100 ml. of cyclohexanone at 25° C.)—0.53–0.55, particle size—1–2 microns, dry bulk density—about 0.25–0.35 gm./cc., loss in weight on heating—about 0.5% max., ash—about 0.5% max.; "Geon 121" is a stir-in type high molecular weight polyvinyl chloride resin in the form of a fine white powder, has a specific gravity of about 1.4, a bulk density of about 20–25 lbs./ft.$^3$, and has a specific viscosity of about 0.57–0.63; "Exon 654" is a high molecular weight dispersion type polyvinyl chloride (white powder) product having a specific gravity of about 1.4 and average relative viscosity of about 2.65; and "Pliovic AO" is a vinyl chloride dispersion resin or copolymer containing about 95% by weight vinyl chloride and some other modifying monomer such as diethyl maleate units (similar products are shown in Bair Patent 2,492,086), has an average particle size of 1–2 microns, an intrinsic viscosity of 0.85, a specific gravity of 1.39, and a bulk density (packed) of 21.5 lbs./ft.$^3$.

The organosol component contains a diluent and/or dispersant such as exemplified by aliphatic hydrocarbons such as V. M. and P. naphtha, aromatic hydrocarbons (e.g., "Penola 150," toluol and xylol), esters (e.g., butyl acetate, amyl acetate), ketones (e.g., diacetone alcohol, methyl ethyl ketone, methyl isobutyl ketone, isophorone, and diisobutyl ketone), glycol ethers (e.g., diethylene glycol monobutyl ether and diethylene glycol monoethyl ether), and nitroparaffins (2-nitropropane). ("Penola 150" has 94% by volume aromatics (ASTMD875), a mixed aniline point (° C.) of 20, a flash point (Tag closed cup, ° F.) of 150, a Kauri-Butanol value of 89.1 and a specific gravity (60/60° F.) of 0.8925.)

The aliphatic hydrocarbons and aromatic hydrocarbons serve as diluents. The ketones, esters and nitroparaffins serve as dispersants. The glycol ethers are both diluents and dispersants.

The organosol component also includes or is used in conjunction with a plasticizer. The plasticizer, for example, may be a phthalate ester, an ester of a straight chain dibasic acid, a phosphate ester, or a polyester. More specifically, the plasticizer may be a member of the group comprising dioctyl phthalate, diisooctyl phthalate, didecyl phthalate, n-octyl n-decyl phthalate, diisodecyl phthlate, dioctyl adipate, diisoadipate, dibutyl adipate, diisodecyl adipate, n-octyl n-decyl adipate, tricresyl phosphate, cresyl phenyl phosphate, trioctyl phosphate, dibutyl sebacate, dioctyl sebacate, and an epoxidized oil such as "Paraplex G-62." "Paraplex G-62" has a molecular weight (average) of about 1,000, a color (Gardner Varnish Scale) of 2 (max.), a specific gravity (25° C./15° C.) of about 0.999, a density of about 8.3 lbs. per gallon, a viscosity (poises, 25° C.) of about 3 to 4, a refractive index ($N^{25}{}_D$) of about 1.471, a freezing point of about +2° C., a flash point (° C.) of about 316, an acid number (mgs. KOH/gm.) of about 1 (max.), and a saponification number (mgs. KOH/gm.) of about 182.

The organosol component includes or is used in conjunction with a stabilizer that inhibits thermal and ultraviolet decomposition. Liquid epoxy resins may be used wherein the viscosity is about 500 cps.–20,000 cps. and the epoxide equivalent is about 140–375. An epoxy resin may be used such as "Bakelite ERL–2774." "Bakelite ERL–2774" is a low molecular weight epoxy resin of the polyglycidyl polyether type which is formed from the reaction of bisphenol A with epichlorhydrin and is in the form of a viscous liquid and has a specific gravity of about 1.15–1.17, a color (Gardner 1933 Standard) of 10 (max.), an epoxide equivalent of about 185–200, and is soluble (clear to light haze) in aromatics, ketones, and alcohols, but settles out in aliphatics.

"Bakelite ERL–2774" also acts as an acid (e.g., hydrochloric acid) scavenger and thus heat-stabilizes the coating composition.

The vinyl chloride copolymer solution grade resin component contains a predominance of vinyl chloride and, for purposes of the invention, may be a commercially available product such as follows: "Bakelite VMCH"; "Exon 470"; "Geon 400–X–110"; "Bakelite VYHH"; and "Bakelite VAGH." "Bakelite VMCH" is preferred.

These modifiers may be more specifically identified as follows: "Bakelite VMCH" is a white, powdered solid containing a solvent polymerized vinyl chloride-vinyl acetate copolymer (since the product contains a predominance of vinyl chloride and vinyl acetate, it may be considered as being a copolymer despite its inclusion of some small amount of maleic acid) with a chemical composition of about 85.0 to 88.0% by weight of vinyl chloride, about 11.0 to 14.0% by weight vinyl acetate, about 0.8 to 1.2% by weight maleic acid, and having a specific viscosity from about 0.536 to 0.567 as measured by 1.0 gm. resin per 100 ml. of solution in the methyl isobutyl ketone at 25° C.; "Exon 470" is a vinyl chloride monohydrogen monoalkyl ester of maleic acid copolymer such as vinyl chloride—a one-half dibutyl maleate ester type copolymer (granular powder), as disclosed in Rowland et al. Patent 2,731,449, reissued as Reissue Patent 24,206, and has a specific gravity of about 1.31, a bulk density (dry) of about 0.8 gm./cc., a bulk density (solution) of about 0.091 gal./lb., and a relative viscosity (1% in cyclohexanone) of about 1.35; "Geon 400–X–110," a white powder, is a vinyl chloride-vinyl acetate copolymer having about 91%±2% vinyl chloride, about 6%±2% vinyl acetate and about 3%±2% maleic acid, and has been reported to have a specific viscosity (at 20° C.) of 0.24, a tensile strength of (2 mil film) 6,500, and 22–26% maximum working solvents; "Bakelite VYHH" contains about 87% by weight vinyl chloride and about 13% by weight vinyl acetate, and has an intrinsic viscosity of about 0.50–0.55 measured in cyclohexanone at 20° C.; and "Bakelite VAGH" contains about 91% by weight vinyl chloride and about 3% by weight vinyl acetate and about 6% by weight vinyl alcohol in the polymer which is produced by "back-hydrolyzing" some of the vinyl acetate, and has an intrinsic viscosity of about 0.57 measured in cyclohexanone at 20° C.

We prefer to use the vinyl chloride-vinyl acetate solution resin instead of the vinyl chloride-maleate solution resin.

The vinyl chloride-vinylidene chloride solution resin component may be omitted from the liquid coating composition, but we much prefer that it be present because it adds moisture resistance or moisture impermeability properties to the baked-on coating. This component may consist of products such as "Geon 222." "Geon 222" is a copolymer of vinyl chloride and vinylidene chloride in proportions of about 26–44.5% by weight vinylidene chloride, has a chlorine content of about 61–64% by weight, and has a specific viscosity of about 0.15–0.30 determined at 20° C. in 0.4% solution of nitrobenzene.

In order to produce a superior product, the acrylic resin syrup should be used irrespective of whether the coating is to have either high gloss or low gloss with low or high angular sheen. The acrylic syrup enhances the adhesion of the coating to metal and, most important, it contributes significantly to the flexibility and exterior durability of the baked-on coating. However, an inferior, but usable high or low gloss coating composition having reduced flexibility may be prepared by replacing all or some of the acrylic syrup with an air-dry or bake-on acrylic resin solution.

The syrup should be of the type disclosed in Belgian Patent 572,359, filed by E. I. du Pont de Nemours and Company, based on an application filed in the United States on Nov. 5, 1957. For example, we have used "Lucite 204–X" Acrylic Syrup which is described in the Belgian patent. "Lucite 204–X" has a viscosity of 15±1 poises and a color, as measured as an APHA No., of not over about 15, a specific gravity as shipped of 1.02, a specific gravity when completely polymerized of 1.18, and the refractive index of the cured or polymerized resin is 1.49. The activity of "Lucite 204–X" was measured on the Sunshine Gel Meter at 60° C. with 2% benzoyl peroxide dry powder as the catalyst, and was found to have about 35 minutes gel time.

The acrylic syrup may contain at least about 20% by weight of polymeric methyl methacrylate in methyl methacrylate monomer. The polymeric methyl methacrylate should have an intrinsic viscosity, at 0.5 gram per deciliter, of about 0.25–1.0, measured in liquid chloroform. The syrup should have a viscosity between about 0.5–50 poises at 25° C. and contain less than 20 p.p.m. of a polymerization initiator.

The syrup can be prepared by one of several suitable processes. For example, by partially polymerizing methyl methacrylate monomer by a process that produces the required polymer. Alternatively, a desired amount of methyl methacrylate polymer of the required intrinsic viscosity may be dissolved in methyl methacrylate monomer.

In the former process, the syrup may be prepared by heating methyl methacrylate ester, free of polymerization inhibitor but containing a small quantity of polymerization initiator, in the presence of a chain transfer agent until the solution reaches a predetermined viscosity. The polymerization may be stopped by adding cold methyl methacrylate monomer containing a polymerization inhibitor such as hydroquinone. For example, a syrup having a viscosity of between about 1–50 poises may be produced with methyl methacrylate monomer, a small predetermined amount of initiator, and about 0.05–1.0 mole percent of a chain transfer agent. This reaction mixture should be heated to a temperature of about 50–150° C. until the desired viscosity is reached and the initiator content is below 20 parts per million. Polymerization is then stopped by cooling the reaction mixture, for example, by adding 1–10 parts by weight of cold methyl methacrylate containing sufficient hydroquinone to inhibit completely the polymerization.

An air-dry or bake solution type acrylic resin is used in combination with the acrylic syrup in producing our preferred high gloss coating compositions. The acrylic solution type resin is primarily used to produce a coating with high gloss, although it also enhances, to some degree, the exterior durability and adhesion properties of the baked-on coating.

For example, the solution type acrylic resin includes resins such as polymers and/or copolymers of methyl, ethyl, n-butyl and isobutyl methacrylate or acrylate. "Acryloid B–44" and "Acryloid A–21" may be used; and these particular products are polymers of esters of acrylic and methacrylic acids which contain nitrogeneous heterocyclic rings rendering the polymers susceptible to condensation reactions. "Acryloids B–44" and "A–21" are described in U.S. Patent 2,881,155. "Acryloid B–44" contains about 40% resin, and a toluol solvent, and has a specific gravity of 0.97, a density of 8.1 lbs./gal., a viscosity of 600–1100 centipoises at 30° C., a color of T–W (Gardner Holdt Scale), and a flash point of 39° F. (closed cup, Tag).

The pigment selected for use in the liquid coating composition should be non-reactive. Since basic pigments induce gelation, neutral pigments should be used, such as titanium dioxide, cadmium yellow, phthalocyanine blue and green, cadmium red, quinacridone red, carbon black, synthetic pure iron oxides and flaked aluminum pigments.

When one wishes to produce a coating having a low gloss, flatting agents such as fine-particle-size silica may be incorporated into the liquid coating composition.

Silica products such as "Santocel 54" and "Syloid 162" may be used as flatting agents.

"Santocel 54" is a light, fluffy, white silica aerogel having 94% "dead air." It is composed of sub-ultramicroscopic fibers of silica having a diameter of about 25–35 angstroms spaced about 300 angstroms apart. It has an average particle size of 0.5–3.0 microns, an absolute density of 17.1 lbs./gal., an oil absorption value of 2.5 gm. oil/gm. (ASTM) and an index of refraction of 1.464.

"Syloid 162" is a synthetic silica flatting agent. This product is a uniform free-flowing powder having an average radius of 4.5–6.5 microns, a dry bulk density (compacted) of 23 lbs./ft.$^3$, a bulking value of 0.0606 solid gal./lb., and an oil absorption value of 145.

The liquid coating composition should have about 20–70% by weight non-volatile material, preferably about 40–60% by weight non-volatile material, depending upon the pigment used and the method by which the metal is coated. When a white pigment such as $TiO_2$ is used, the liquid coating composition should preferably contain about 30–50% by weight pigment based on non-volatiles and the composition should preferably contain about 40–60% by weight non-volatile materials.

Table I illustrates various proportions that may be used to prepare either a satisfactory flat or high gloss liquid coating composition.

TABLE I

*Flat or high gloss liquid composition*

| Non-volatile constituents: | Percent by weight based on weight of non-volatile materials [1] |
|---|---|
| Acrylic resin component | 2–40 |
| Solution resins: | |
|   Vinyl chloride-vinyl acetate copolymer and/or vinyl chloride-one-half lower alkyl ester of maleic acid component | 9–34 |
|   Vinyl chloride-vinylidene chloride copolymer resin | 0–11.5 |
| Dispersion resin(s): Vinyl chloride resin | 10–34 |
| Stabilizer | 0.5–11 |
| Plasticizer | 5–25 |
| Pigment | 10–55 |

| Volatile constituents: | Percent by weight based on weight of volatile materials |
|---|---|
| Diluent | 0–60 |
| Solvent | 40–100 |

[1] The percent by weight non-volatiles expressed in this table and the tables, examples and claims which follow is based upon the percent by weight non-volatiles as determined with ASTM Method D1644–59, Standard Method of Test for Non-Volatile Content of Varnishes.

Table II, infra, illustrates various proportions of constituents that may be used in producing the preferred high and low gloss coating composition having about 40–60% by weight non-volatile materials.

TABLE II.—LIQUID FLAT OR HIGH GLOSS COMPOSITION

| Non-Volatile Constituents | Percent by Weight Based on Weight of Non-Volatile Materials | |
|---|---|---|
| | High Gloss | Low Gloss |
| Acrylic Resin Component | 5–25 | 2–15 |
| Solution Resins: | | |
|   Vinyl Chloride-Vinyl Acetate Copolymer and/or Vinyl Chloride-One-Half Lower Alkyl Ester of Maleic Acid Component | 9–18 | 11–19 |
|   Vinyl Chloride-Vinylidene Chloride Copolymer | 1–6 | 1–6 |
| Dispersion Resin(s), Vinyl Chloride Resin | 10–18 | 13–34 |
| Stabilizer | 0.5–11 | 0.5–11 |
| Plasticizer | 9–18 | 5–18 |
| Pigment | 10–50 | 10–55 |

| | Percent by Weight Based on Weight of Volatile Materials | |
|---|---|---|
| Volatile Constituents: | | |
| Diluent | 30–60 | 30–60 |
| Solvent | 40–70 | 40–70 |

In order to produce a coating composition having a flat finish and high angular sheen, such as produced by Example I, the solvent(s) and diluent(s) are first mixed and the vinyl chloride copolymer solution resin dissolved therein. The vinyl chloride-vinylidene chloride resin is then added and dissolved in the solution. (Plasticizer(s), stabilizer(s), pigment(s), modifying resin(s) and flatting paste are then added. The flatting paste comprises a flatting agent that has been previously dispersed in solvent and one of the modifying resins, and may be prepared by treating these constituents in a pebble mill for about 6–8 hours.) The vinyl chloride dispersion resin is added last and the mixture stirred until a homogeneous mixture is obtained. The mixture may then be processed through a high-speed sand mill (such as disclosed in U.S. Patent 2,581,414) to a Hegman fineness of about 6. The vinyl dispersion resin may be omitted from the grind portion of the formula and incorporated afterward under agitation.

If a low angular sheen, flat finish is desired, such as produced by Example II, the flatting paste is omitted from the charge that is treated in the mill, and is later added to the material that is obtained from the high-speed sand mill.

A high gloss coating composition, such as produced by Example III, may be prepared by omitting the flatting agent and replacing it with the acrylic solution resin.

A high gloss coating composition is made by mixing the solvent(s) and diluent(s), adding and dissolving the vinyl chloride copolymer solution resin therein, and adding and dissolving therein the vinyl chloride-vinylidene chloride resin. Plasticizer(s), stabilizer(s), acrylic syrup resin, air-dry or bake-type acrylic solution resin, pigment(s), and vinyl chloride dispersion resin may then be added and mixed therewith in a high-speed sand mill until a homogeneous mixture and Hegman fineness of about 6.5–7 is obtained. This may require two passes through the sand mill, instead of one as required for the flat material.

EXAMPLE I

Flat white coating composition with high angular sheen

| Constituents.—Part A: | Parts by weight |
|---|---|
| Solution resin: Bakelite VMCH | 84 |
| Plasticizer: Diisodecyl phthalate | 26.5 |
| Stabilizer: Bakelite ERL 2774 | 31 |
| Plasticizer-stabilizer: Paraplex G-62 | 15 |
| Diluent: Penola 150 | 221 |
| Solvent: | |
| Isophorone | 101 |
| Diisobutyl ketone | 116 |
| Solvent-diluent: Butyl Carbitol | 20 |
| Solution resin: Geon 222 | 10.5 |

Part B.—(Pre-dispersed in a pebble mill for 6–8 hrs. to Hegman Fineness of 6):

| Flatting agent: | |
|---|---|
| Syloid 162 | 11.3 |
| Santocel 54 | 5.4 |
| Solution resin: Bakelite VAGH | 6.3 |
| Solvent: | |
| Methyl isobutyl ketone | 40.2 |
| Isophorone | 34.8 |

Part C:

| Organosol dispersion resin: Bakelite QYNV | 75 |
|---|---|
| Acrylic syrup: | |
| Lucite 204-X | 72 |
| Methyl methacrylate monomer | 4.5 |
| Pigment:[1] TiO$_2$ | 198 |
| Total | 1072.5 |

[1] Du Pont's R-610 rutile titanium dioxide.

EXAMPLE II

Flat white coating composition with low angular sheen

| Constituents.—Part A: | Parts by weight |
|---|---|
| Solution resin: Bakelite VMCH | 65 |
| Plasticizer: Diisodecyl phthalate | 68 |
| Stabilizer: Bakelite ERL 2774 | 22 |
| Plasticizer-stabilizer: Paraplex G-62 | 10 |
| Diluent: Penola 150 | 162 |
| Solvent: | |
| Isophorone | 104 |
| Diisobutyl ketone | 113 |
| Methyl isobutyl ketone | 41 |
| Solvent-diluent: Butyl carbitol | 27 |
| Diluent-cosolvent: n-Butanol | 10 |
| Solution resin: Geon 222 | 8 |

Part B.—(Pre-dispersed in a pebble mill for 6–8 hrs. to Hegman Fineness of 6):

| Flatting agent: | |
|---|---|
| Syloid 162 | 9.9 |
| Santocel 54 | 4.7 |
| Solution resin: Bakelite VAGH | 5.6 |
| Solvent: | |
| Methyl isobutyl ketone | 35.3 |
| Isophorone | 30.5 |

Part C:

| Organosol dispersion resin: Bakelite QYNV | 108 |
|---|---|
| Acrylic syrup: | |
| Lucite 204-X | 50 |
| Methyl methacrylate monomer | 3 |
| Pigment[1]: TiO$_2$ | 198 |
| Total | 1075.0 |

[1] Du Pont's R-610 rutile titanium dioxide.

EXAMPLE III

High gloss white coating composition

| Constituents: | Parts by weight |
|---|---|
| Solution resin: Bakelite VMCH | 75 |
| Plasticizer: Diisodecyl phthalate | 37 |
| Plasticizer-stabilizer: Paraplex G-62 | 19 |
| Diluent: Penola 150 | 196 |
| Solvent: | |
| Isophorone | 91 |
| Diisobutyl ketone | 103 |
| Solvent-diluent: Butyl carbitol | 19 |
| Solution resin: Geon 222 | 9 |
| Organosol dispersion resin: Bakelite QYNV | 66 |
| Acrylic syrup: | |
| Lucite 204-X | 67 |
| Methyl methacrylate monomer | 4 |
| Acrylic solution resin (40% resin): Acryloid B-44 | 86 |
| Stabilizer: Bakelite ERL 2774 | 28 |
| Mar resistance additive: 30% lanolin in penola 150 | 38 |
| Flow control and anti-eyehold agent 15%[1] ethyl cellulose in butyl cellosolve | 5 |
| Pigment[2]: TiO$_2$ | 245 |
| Total | 1088 |

[1] Hercules Powder Co.'s T-50.
[2] Du Pont's R-900 rutile titanium dioxide.

Example IV, below, shows that the critical combination of resinous components herein disclosed produced baked-on coatings that are unexpectedly superior to coatings produced with (a) the combination of the vinyl chloride dispersion resin component and vinyl chloride copolymer solution resin component, or (b) the combination of the dispersion resin component and acrylic resin component, or (c) the combination of the solution resin component and acrylic resin component.

As shown in detail in Example IV, four coating compositions were prepared. Composition "ABC" included the combination of the vinyl chloride dispersion resin ("A"), solution grade vinyl chloride-vinyl acetate copolymer resin ("B"), and acrylic resin ("C"), as herein disclosed. Composition "AB" contained the vinyl chloride dispersion resin and solution grade vinyl chloride-vinyl acetate copolymer resin. Composition "AC" included the vinyl chloride dispersion resin and acrylic resin. Composition "BC" included the solution grade vinyl chloride-vinyl acetate copolymer resin and acrylic resin.

In all of these liquid coating compositions, the dispersion resin, solution resin, and acrylic resin, when present, were used in weight ratios of about 1.5:1:0.35, respectively.

In one series of tests, compositions "ABC," "AB," "AC" and "BC" were each applied to test panels 0.019 in. thick made of steel and the coated panels were heated for 10 minutes at 365° F. In a second series of tests, each of these compositions was applied to test panels 0.021 in. thick made of aluminum, and the coated panels were heated for 10 minutes at 365° F. In both series of tests, the test panels were baked in a gas-fired, forced-air circulating oven. The test panels had about 10 mg. of baked-on coating per square inch of panel.

After the coatings were cured (in both series of tests), their properties were determined and reported.

Table III of Example IV concerns the coated steel panels, whereas Table IV of Example IV concerns coated aluminum panels. Each of these tables shows the weather resistance, humidity resistance, salt spray resistance, impact resistance, flexibility and adhesion, abrasion resistance, the relative cost, and appearance of each of compositions "ABC," "AB," "AC" and "BC." Table V of Example IV describes procedures that were used in determining properties of the baked-on coatings.

It is clear from Example IV that composition "ABC" produced a significantly superior coating or film on both steel and aluminum than was obtained with each of the other compositions. In both series of tests, using both steel and aluminum substrates, composition "ABC" had a markedly better combination of properties, as evidenced by "Total Rating" values (determined by totaling the values obtained for all of the tests) shown in Tables III and IV, which combination of properties includes weather resistance, humidity resistance, salt spray resistance, impact resistance, flexibility and adhesion, abrasion resistance and appearance. In addition, in conducting the tests, it was found that Composition "ABC" cost less than the other compositions.

EXAMPLE IV

A stabilized liquid coating composition having 30% by weight non-volatile materials was prepared containing 475 parts by weight of a vinyl chloride dispersion resin, 315 parts by weight of a solution grade vinyl chloride-vinyl acetate copolymer, 110 parts by weight of an acrylic resin, and 16 parts by weight of a stabilizer, wherein the parts by weight are based on non-volatile constituents. The volatile constituents consisted of equal parts by weight of diisobutyl ketone and aromatic hydrocarbon solvent. This composition, hereinafter identified as composition "ABC," had the following composition:

COMPOSITION "ABC"

| | Parts by weight non-volatile material |
|---|---|
| Dispersion resin: Bakelite QYNV | 475 |
| Solution resin: Bakelite VMCH | 315 |
| Acrylic resin: Acryloid B-44 | 110 |
| Stabilizer: Bakelite ERL-2774 | 16 |

The chemical compositions of certain of the materials used in composition "ABC," as well as compositions "AB," "AC" and "BC," are described supra, except "Acryloid B-44" used therein was in solid form.

The aromatic hydrocarbon solvent used in composition "ABC," as well as all of the other compositions herein, was "Solvesso 100." "Solvesso 100" has a boiling range (° F.) of 311° (initial), 320° at 50% and 344° (dry point); has a flash point (Tag, closed cup, ° F.) of 107°; has a specific gravity of 0.8729; weighs 7.268 lbs./gal.; has a mixed aniline point (° F.) of 57°; has a Kauri-Butanol value of 91; and has a Saybolt color of +30.

A second stabilized liquid coating composition having 30% by weight non-volatile materials was prepared containing 540 parts by weight of a vinyl chloride dispersion resin, 360 parts by weight of a solution grade vinyl chloride-vinyl acetate copolymer, and 18 parts by weight of a stabilizer, wherein the parts by weight are based on non-volatile constituents. The volatile constituents consisted of equal parts by weight of diisobutyl ketone and aromatic hydrocarbon solvent ("Solvesso 100"). This composition, identified as composition "AB," had the following composition:

COMPOSITION "AB"

| | Parts by weight non-volatile material |
|---|---|
| Dispersion resin: Bakelite QYNV | 540 |
| Solution resin: Bakelite VMCH | 360 |
| Stabilizer: Bakelite ERL-2774 | 18 |

A third stabilized liquid coating composition having 30% by weight non-volatile materials was prepared containing 732 parts by weight of a vinyl chloride dispersion resin, 168 parts by weight of an acrylic resin, and 14.5 parts by weight of a stabilizer, wherein the parts by weight are based on non-volatile constituents. The volatile constituents consisted of equal parts by weight of diisobutyl ketone and aromatic hydrocarbon solvent ("Solvesso 100"). This composition, identified as composition "AC," had the following composition:

COMPOSITION "AC"

| | Parts by weight non-volatile material |
|---|---|
| Dispersion resin: Bakelite QYNV | 732 |
| Acrylic resin: Acryloid B-44 | 168 |
| Stabilizer: Bakelite ERL-2774 | 14.5 |

A fourth stabilized liquid coating composition having 25% by weight non-volatile materials was prepared containing 556 parts by weight of a solution grade vinyl chloride-vinyl acetate copolymer, 194 parts by weight of an acrylic resin, and 11 parts by weight of a stabilizer, wherein the parts by weight are based on non-volatile constituents. The volatile constituents consisted of equal parts by weight of diisobutyl ketone and aromatic hydrocarbon ("Solvesso 100"). This composition, identified as composition "BC," had the following composition:

COMPOSITION "BC"

| | Parts by weight non-volatile material |
|---|---|
| Solution resin: Bakelite VMCH | 556 |
| Acrylic resin: Acryloid B-44 | 194 |
| Stabilizer: Bakelite ERL-2774 | 11 |

A stabilizer was included in the above liquid coating compositions to prevent charring of each of the coatings during the bake cycle.

All of the above liquid coating compositions contained 30% by weight non-volatile materials except composition "BC," which contained 25% by weight non-volatile materials in order to make it less viscous and facilitate its application to test panels.

In all of the above liquid coating compositions, the aforesaid dispersion resin, solution resin, and acrylic resin, when present, were used in weight ratios of about 1.5:1:0.35, respectively.

In one series of tests, compositions "ABC," "AB," "AC" and "BC" were each applied to test panels 0.019 in. thick made of treated steel and the coated panels were heated for 10 minutes at 365° F. The steel panels were pretreated in a conventional manner with "Bonderite 1000" which is reported to form a phosphate coating in accordance with U.S. Patent 2,609,308. In a second series of tests, each of these compositions was applied to test panels 0.021 in. thick made of treated aluminum, and the coated panels were heated for 10 minutes at 365° F. The aluminum panels were pretreated in a conventional manner with "Alodine 1200" which is reported to form an amorphous chromate coating and to be composed of hexavalent chromium ions, fluoride ions and ferricyanide ions similar to those described in U.S. Patent 2,796,370. In both series of tests, the test panels were baked in a gas-fired, forced-air circulating oven. The test panels had about 10 mg. of baked-on coating per square inch of panel.

After the coatings were cured (in both series of tests), their properties were determined and reported.

Table III, below, concerns the coated panels of treated steel, whereas Table IV, below, concerns the coated panels of treated aluminum. Each of these tables shows the weather resistance, humidity resistance, salt spray resistance, impact resistance, flexibility and adhesion, abrasion resistance, the relative cost, and appearance of each of compositions "ABC," "AB," "AC" and "BC." Table V, below, describes procedures that were used in determining properties of the baked-on coatings.

TABLE V.—TESTS DESIGNATED IN TABLES III AND IV

Subscript number in Tables III and IV

Test 1.—Dew point weatherometer tests: This is considerably more severe than a conventional Twin Arc Weatherometer. The coated panels are exposed to continuous cycles of one hour of ultra violet light and one hour of darkness. All the while a cold water spray is impinging on the backs of the panels.

Test 2.—Test in humidity cabinet: Coatings are exposed to an atmosphere of 100% relative humidity and at 100° F.

Test 3.—Test in salt spray cabinet: Coatings are exposed to a salt fog composed of 5% sea salt in 95% water at 100° F.

Test 4.—Impact test with Gardner impact tester: Coated panels are bumped by a 2-lb. weight falling through a measured distance. All aluminum panels had 60 in./lbs. impact. (Higher impacts burst the metal). All steel panels had 160 in./lbs. impact.

Test 5.—Flexibility and adhesion tests: These tests were made on a wedge bender which caused the metal to bend back on itself in a cone varying from 0 inch radius to ¼ inch radius. The bend had Scotch brand tape pressed firmly on the coating and pulled away. The amount of coating pulled away is a measure of flexibility and adhesion.

Test 6.—Abrasion resistance test: Abrasion resistance was measured by use of the Taber Abraser which counts the number of revolutions required for two small abrasive wheels to grind through a measured film thickness of coating. CS-17 Abrader wheels were used with 1000-gram weights.

It is clear from the above series of tests that were used in evaluating coating compositions "ABC," "AB," "AC," and "BC" that composition "ABC" produced a significantly superior coating or film on both steel and aluminum. In both series of tests, using both steel and aluminum substrates, composition "ABC" had a markedly better combination of properties, as evidenced by "Total Rating" values (determined by totaling the values obtained for all of the tests reported on a particular line) in Tables III and IV, which combination of properties includes weather resistance, humidity resistance, salt spray resistance, impact resistance, flexibility and adhesion, abrasion resistance, and appearance. In addition, composition "ABC" cost less than the other compositions.

The foregoing detailed description has been given for clearness of understanding only, and no unnecessary limitations should be understood therefrom, as modifications will be obvious to those skilled in the art.

TABLE III

[0=Best results; 5=Poorest results; Values between 0 and 5 represent graduations.]

| Coating Composition | Substrate | Condition of Cure | 100 hrs. Dew Point Weatherometer¹ | 100 hrs. Humidity² | 100 hrs. Salt Spray³ | Impact Resistance⁴ | Flexibility⁵ | Tabor Abrasion⁶ | Appearance | Cost (Sq. ft.) | Total Rating |
|---|---|---|---|---|---|---|---|---|---|---|---|
| Composition "ABC" | Treated Steel | 10 minutes at 365° F | 1 | 0 | 1 | 0 | 0 | 3 | 0 | 0 | 5 |
| Composition "AB" | do | do | 3 | 0 | 3 | 0 | 1 | 4 | 0 | 3 | 14 |
| Composition "AC" | do | do | 5 | 3 | 5 | 0 | 3 | 1 | 5 | 2 | 24 |
| Composition "BC" | do | do | 5 | 1 | 2 | 0 | 0 | 2 | 3 | 4 | 17 |

¹ Mud cracks.

TABLE IV

[0=Best results; 5=Poorest results; Values between 0 and 5 represent graduations.]

| Coating Composition | Substrate | Condition of Cure | 100 hrs. Dew Point Weatherometer¹ | 100 hrs. Humidity² | 100 hrs. Salt Spray³ | Impact Resistance⁴ | Flexibility⁵ | Tabor Abrasion⁶ | Appearance | Cost (Sq. ft.) | Total Rating |
|---|---|---|---|---|---|---|---|---|---|---|---|
| Composition "ABC" | Treated Aluminum | 10 minutes at 365° F | 2 | 0 | 0 | 1 | 0 | 3 | 0 | 0 | 6 |
| Composition "AB" | do | do | 3 | 0 | 0 | 1 | 2 | 4 | 0 | 3 | 13 |
| Composition "AC" | do | do | 5 | 0 | 1 | 3 | 1 | 1 | 5 | 2 | 18 |
| Composition "BC" | do | do | 3 | 0 | 0 | 0 | 0 | 2 | 3 | 4 | 12 |

¹ Mud cracks.

We claim:

1. A liquid coating composition suitable for use in coating metal and being baked thereon to provide an adherent coating, the resinous portion of said composition consisting essentially of: a vinyl chloride organosol dispersion resin containing at least about 90% by weight of polymerized vinyl chloride; a vinyl chloride copolymer solution resin, said copolymer being at least 80% by weight polymerized vinyl chloride and being a member of the group consisting of vinyl chloride-vinyl acetate and vinyl chloride monohydrogen monoalkyl ester of maleic acid; an acrylic resin component from the group consisting of acrylic resin syrup containing at least 20% by weight of polymeric methyl methacrylate in methyl methacrylate monomer, acrylic solution resin, and admixtures thereof; and organic liquid vehicle; said composition having about 20–70% by weight nonvolatiles containing about 10–34 parts by weight vinyl chloride dispersion resin, about 9–34 parts by weight vinyl chloride copolymer solution resin, and about 2–40 parts by weight acrylic resin component; and said composition being capable of being applied as a heat-stable, compatible, substantially homogeneous composition onto a metal surface and of being baked thereon at a temperature of about 350–450° F. to form a cured adherent coating.

2. The liquid coating composition of claim 1 in which said nonvolatiles include a vinyl chloride-vinylidene chloride solution resin that is present therein an amount not exceeding about 11.5 parts by weight.

3. The liquid coating composition of claim 1 in which the acrylic resin is an acrylic resin syrup of polymeric methyl methacrylate in methyl methacrylate monomer.

4. The liquid coating composition of claim 1 in which the acrylic resin is an acrylic solution resin.

5. The liquid coating composition of claim 1 which includes up to about 11% by weight, based on the weight of the nonvolatiles, of a low molecular weight epoxide resin.

6. A heat-stable, liquid coating composition suitable for use in coating metal and being baked thereon to provide an adherent coating, the resinous portion of said composition consisting essentially of: a vinyl chloride organosol dispersion resin containing at least about 90% by weight of polymerized vinyl chloride; a vinyl chloride copolymer solution resin, said copolymer being at least 80% by weight polymerized vinyl chloride and being a member of the group consisting of vinyl chloride-vinyl acetate and vinyl chloride monohydrogen monoalkyl ester of maleic acid; an acrylic resin component from the group consisting of acrylic resin syrup containing at least 20% by weight of polymeric methyl methacrylate in methyl methacrylate monomer, acrylic solution resin, and admixture thereof; and organic liquid vehicle; said composition having about 20–70% by weight nonvolatiles containing about 10–34% by weight vinyl chloride dispersion resin, about 9–34% by weight vinyl chloride copolymer solution resin, and about 2–40% by weight acrylic resin; and said composition being capable of being applied as a compatible, substantially homogeneous composition onto a metal surface and of being baked thereon at a temperature of about 350–450° F. to form a cured adherent coating.

7. The liquid coating composition of claim 6 in which the acrylic resin is an acrylic resin syrup containing at least about 20% by weight of polymeric methyl methacrylate in methyl methacrylate monomer.

8. The liquid coating composition of claim 6 in which the acrylic resin is an acrylic solution resin.

9. A plasticized, stabilized, liquid coating composition suitable for use in coating metal and being baked thereon to provide a stable adherent coating, the resinous portion of said composition consisting essentially of: a vinyl chloride organosol dispersion resin containing at least about 90% by wegiht of polymerized vinyl chloride; a vinyl chloride copolymer solution resin, said copolymer being at least 80% by weight polymerized vinyl chloride and being a member of the group consisting of vinyl chloride- vinyl acetate and vinyl chloride monohydrogen monoalkyl ester of maleic acid; a vinyl chloride-vinylidene chloride solution resin; an acrylic resin component from the group consisting of acrylic resin syrup containing at least 20% by weight of polymeric methyl methacrylate in methyl methacrylate monomer, acrylic solution resin, and admixture thereof; and organic liquid vehicle; said composition having about 20–70% by weight nonvolatiles containing about 10–34 parts by weight vinyl chloride dispersion resin, about 9–34 parts by weight vinyl chloride copolymer solution resin, not more than about 11.5 parts by weight vinyl chloride-vinylidene chloride solution resin, and about 2–40 parts by weight acrylic resin; and said composition being capable of being applied as a compatible, substantially homogeneous composition onto a metal surface and of being baked thereon at a temperature of about 350–450° F. to form a cured adherent coating.

10. A stabilized, liquid coating composition suitable for use in coating metal and being baked thereon to provide an adherent coating, the resinous portion of said composition consisting essentially of: a vinyl chloride organosol dispersion resin containing at least about 90% by weight of polymerized vinyl chloride; a vinyl chloride copolymer solution resin, said copolymer being at least 80% by weight polymerized vinyl chloride and being a member of the group consisting of vinyl chloride-vinyl acetate and vinyl chloride monohydrogen monoalkyl ester of maleic acid an acrylic resin component from the group consisting of acrylic resin syrup containing at least 20% by weight of polymeric methyl methacrylate in methyl methacrylate monomer, acrylic solution resin, and admixture thereof; a non-reactive neutral pigment; and organic liquid vehicle; said composition having about 20–70% by weight nonvolatiles containing about 10–34 parts by weight vinyl chloride dispersion resin, about 9–34 parts by weight vinyl chloride copolymer solution resin, about 2–40 parts by weight acrylic resin, and about 10–55 parts by weight pigment; and said composition being capable of being applied as a compatible, substantially homogeneous composition onto a metal surface and of being baked thereon at a temperature of about 350–450° F. to form a stable, flexible, cured adherent coating.

11. A liquid coating composition suitable for use in coating metal and being baked thereon to provide an adherent coating, the resinous portion of said composition consisting essentially of: a vinyl chloride organosol dispersion resin containing at least about 90% by weight of polymerized vinyl chloride; a vinyl chloride copolymer solution resin, said copolymer being at least 80% by weight polymerized vinyl chloride and being a member of the group consisting of vinyl chloride-vinyl acetate and vinyl chloride monohydrogen monoalkyl ester of maleic acid; a non-air-drying acrylic casting resin syrup component containing at least 20% by weight of polymeric methyl methacrylate in methyl methacrylate monomer; and organic liquid vehicle; said composition having about 20–70% by weight nonvolatiles containing about 10–34 parts by weight vinyl chloride dispersion resin, about 9–34 parts by weight vinyl chloride copolymer solution resin, and about 2–40 parts by weight acrylic resin component; and said composition being capable of being applied as a heat-stable, compatible, substantially homogeneous composition onto a metal surface and of being baked thereon at a temperature of about 350–450° F. to form a cured adherent coating.

12. The liquid coating composition of claim 11 which includes up to about 11% by weight, based on the weight of the nonvolatiles, of a low molecular weight epoxide resin.

13. A metal article whose surface is provided with a baked-on adherent coating, said coating being produced by baking on the article a stabilized, liquid, substantially homogeneous compatible coating composition the resinous portion of which consists essentially of: a vinyl chloride organosol dispersion resin containing at least about 90% by weight of polymerized vinyl chloride; a vinyl chloride copolymer solution resin, said copolymer being at least 80% by weight polymerized vinyl chloride and being a member of the group consisting of vinyl chloride-vinyl acetate and vinyl chloride monohydrogen monoalkyl ester of maleic acid, an acrylic resin component from the group consisting of acrylic resin syrup containing at least 20% by weight of polymeric methyl methacrylate in methyl methacrylate monomer, acrylic solution resin, and admixtures thereof, and organic liquid vehicle; said liquid composition having about 20–70% by weight nonvolatiles containing about 10–34 parts by weight vinyl chloride dispersion resin, about 9–34 parts by weight vinyl chloride copolymer solution resin, and about 2–40 parts by weight acrylic resin component; and said liquid composition being capable of being applied as a compatible, substantially homogeneous composition onto the metal surface of the article and of being baked thereon at a temperature of about 350–450° F. to form a cured adherent coating.

References Cited

UNITED STATES PATENTS

| | | | |
|---|---|---|---|
| 3,154,600 | 10/1964 | Munn | 260—884 |
| 3,305,602 | 2/1967 | Bromstead | 260—884 |

ALLAN LIEBERMAN, *Primary Examiner.*

U.S. Cl. X.R.

260—836, 837, 884, 899